April 14, 1953 J. M. WOLFSKILL 2,635,199

PIEZOELECTRIC CRYSTAL APPARATUS

Filed Jan. 8, 1948 5 Sheets-Sheet 1

Inventor

John M. Wolfskill

By

Ben. J. Chromy, his atty

Inventor
John M. Wolfskill
By
Ben. J. Chromy, his atty.

April 14, 1953 J. M. WOLFSKILL 2,635,199

PIEZOELECTRIC CRYSTAL APPARATUS

Filed Jan. 8, 1948 5 Sheets-Sheet 3

Inventor

John M. Wolfskill

By Ben. J. Chromy, his atty.

April 14, 1953 J. M. WOLFSKILL 2,635,199

PIEZOELECTRIC CRYSTAL APPARATUS

Filed Jan. 8, 1948 5 Sheets-Sheet 4

Inventor
John M. Wolfskill

By Ben. J. Chromy, his atty

April 14, 1953 J. M. WOLFSKILL 2,635,199

PIEZOELECTRIC CRYSTAL APPARATUS

Filed Jan. 8, 1948 5 Sheets-Sheet 5

Inventor

John M. Wolfskill

By Ben. J. Chromy his atty.

Patented Apr. 14, 1953 2,635,199

UNITED STATES PATENT OFFICE 2,635,199

PIEZOELECTRIC CRYSTAL APPARATUS

John M. Wolfskill, Erie, Pa.

Application January 8, 1948, Serial No. 1,089

14 Claims. (Cl. 310—9.7)

Figure 2:
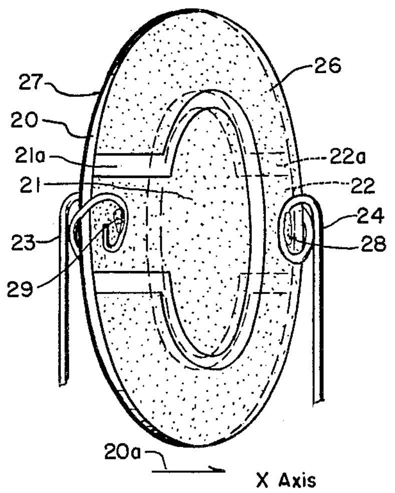

This invention pertains to piezoelectric crystals and to a method of mounting. More particularly this invention relates to piezoelectric crystals of improved frequency stability and activity performance and to the manufacture of such crystals.

It is an object of this invention to provide piezoelectric crystals with contiguous electrodes of varying areas and configurations so as to provide improved activity over a wide range of temperature and frequency.

It is another object of this invention to provide good electrical contact to contiguous electrodes of piezoelectric crystals so as to reduce the damping action of such contact as well as the contact resistance.

Still another object of this invention is to provide a means of deactivating an unused portion of a piezoelectric crystal blank so as to provide a piezoelectric crystal blank of increased frequency and activity stability over a wide temperature range.

It is another object of this invention to provide a piezoelectric crystal blank with a means for shorting out the unused portion of the crystal blank so as to greatly reduce coupling between the wanted mode of oscillation and any unwanted modes.

Still another object of this invention is to provide electrode structure to piezoelectric crystals of configuration such that the contiguous electrode design may be easily varied so as to vary the total capacity of the crystal holder unit and thereby provide an optimum value or values as the crystals are used in different frequency ranges.

Another object of this invention is to provide a piezoelectric crystal blank mounted so as to be substantially free of damping caused by the mounting and adapted to oscillate in the 3 to 20 megacycle frequency range, said crystal blank being provided with electrodes arranged to increase the frequency and activity stability of the crystal blank over a wide temperature range.

A further object of this invention is to provide a piezoelectric crystal blank with small button shaped electrodes contacting correspondingly small areas of the major faces of the crystal blank so as to provide a portion of the crystal blank to act as a termination for the oscillating portion of the crystal blank and reduce interference from undesired modes of oscillation.

Still a further object of this invention is to provide a piezoelectric crystal with electrodes such that interference from undesired modes of oscillation is reduced and such that the frequency and activity stability of the crystal blank is increased over a wide temperature range.

Other and further objects of this invention will be apparent to those skilled in the art to which it relates from the following specification, claims and drawing.

Prior to this invention piezoelectric crystals in the range from 3 to 20 megacycles substantially freely mounted on the wire loop type of assembly in which the crystal is clamped between adjacent turns of a spring or any other simplified mounting of similar type where contiguous electrodes are used, considerable difficulty was encountered as the crystals were subjected to a wide temperature range in variations in the activity of the crystals. It is well known that crystals so mounted will have numerous points in the temperature range at which coupling to other modes of oscillation such as multiple and submultiples of flexural and extension modes causes these modes to interfere with the desired mode, resulting in what is known as activity dips and frequency jumps even to the point of complete failure of the crystals over some narrow temperature interval. In most cases a freely mounted crystal of this type is extremely erratic with temperature and becomes almost useless if the unit is required to maintain a relatively high minimum activity over a wide temperature range.

An analysis of this difficulty was made and it was found to be due to undesirable couplings which can exert considerable influence on the desired frequency of oscillation when the lateral blank dimensions are relatively small, that is, ⅝″ square or ⅝″ in diameter or less. If a quartz plate were infinite in its lateral dimensions, the edges or periphery of the plate would be properly terminated and substantially no deleterious effects would be noticed from these coupled modes, except possibly flexural modes which would tend to excite vibrational modes similar to those in a diaphragm. With a finite dimensioned quartz plate it is necessary to either dimension the plate carefully on its lateral dimensions so that these other coupled modes are sufficiently far removed as not to interfere with the desired mode over the temperature range throughout which the crystal is required to operate, or terminate the periphery of the plate by some other method.

Dimensioning of quartz plates to reduce this effect requires that extremely close tolerances be maintained. In fact above 5 megacycles it is very difficult to hold physical dimensions close enough to get duplication from one crystal to the next. At these frequencies, other factors such as surface finish, contour, and parallelism of the faces vary sufficiently in a given process or operation that they exert sufficient influence on the coupling to other modes that even a perfectly dimensioned group of crystals will in all probability not duplicate in their performance.

One method of reducing to some extent this interference from coupled modes, is to use an electrode or electrodes considerably smaller than the crystal plate with the idea that only the small area would be excited and that the unplated area would then serve as a termination for the oscillating portion. By observing such crystals in an evacuated envelope in which a rare gas had been admitted, it was noticed that these undesirable couplings still made themselves manifest, that activity dips were still present, and that nodal points of high potential spots developed on the crystal surfaces, indicated by a glow discharge outside of the plated area. The glow discharge would move over the crystal surface in quick jumps as the temperature of the crystal was varied. Activity dips were directly related to the jumping about of the glow on the surface. It is one of the objects of this invention to collect or distribute these charges over the crystal surface so that no high potential points could actually develop on the crystal surface. This is accomplished by plating the entire surface of the crystal with a conducting material except a dividing line between the desired active electrode size and the unused part of the quartz plate, and then shorting the unused portion directly across the edge of the crystal to the opposite active electrode, or shorting out the unused portion of one side to the unused portion on the opposite side.

There are a number of ways in which these shorting electrodes can be arranged on either round, square, or rectangular crystals as will be brought out in detail hereinafter and the important part is that the entire surface of the quartz blank except the dividing line between the electrodes be coated so that the charges on the crystal surface are taken care of and either dissipated in high resistance plating, or shorted out to the opposite side so that the charges never develop. Such charges therefore, cannot excite unwanted modes of oscillation in the crystal to interfere with the desired mode. By using high resistance plating in the areas outside of the active electrodes such as graphite or very thin coating of aluminum, gold, or silver somewhat the same effect is produced, however, it is not as practical to control the plating resistance as to use the shorting out method.

Figure 3:
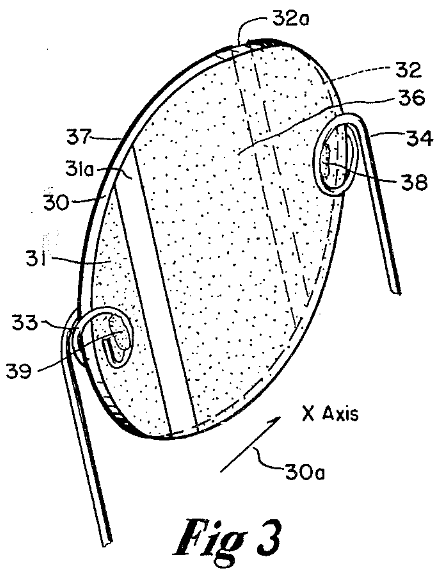
Figure 1:
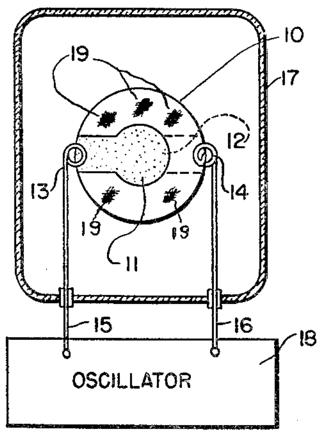
Figure 6:
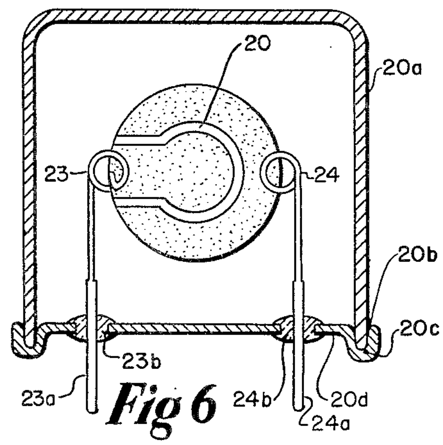
Figure 4:
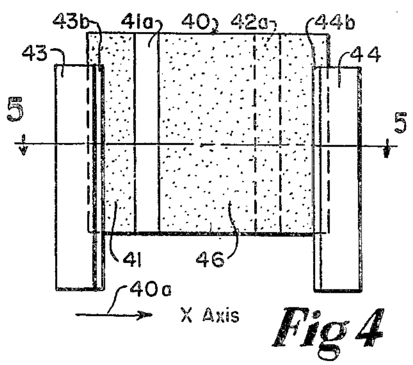
Figure 5:
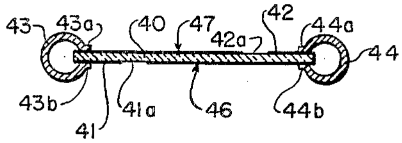
Figure 7:
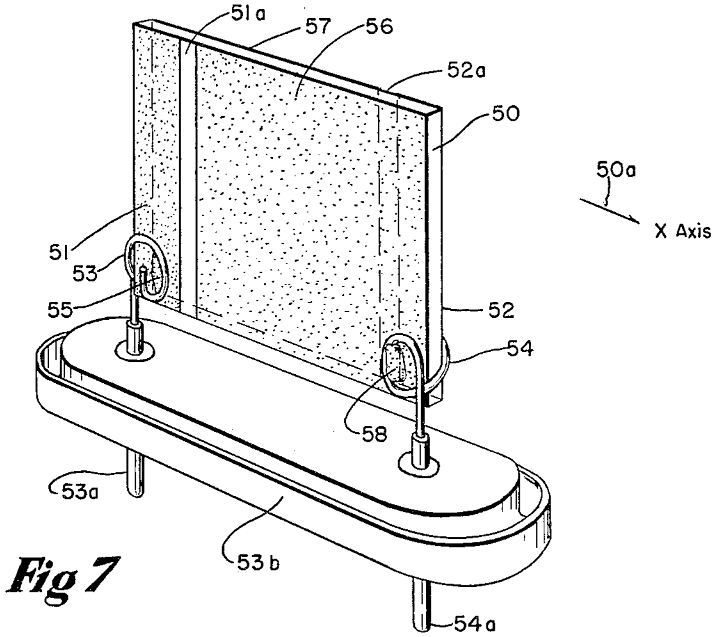
Figure 8:
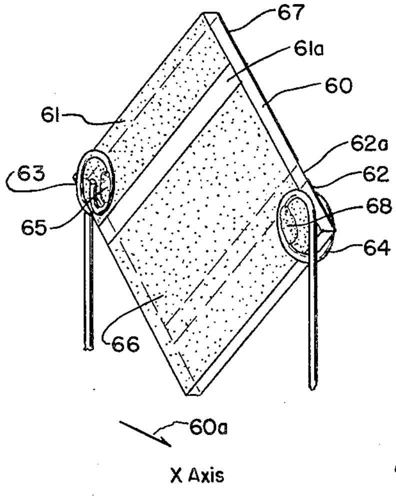
Figure 9:
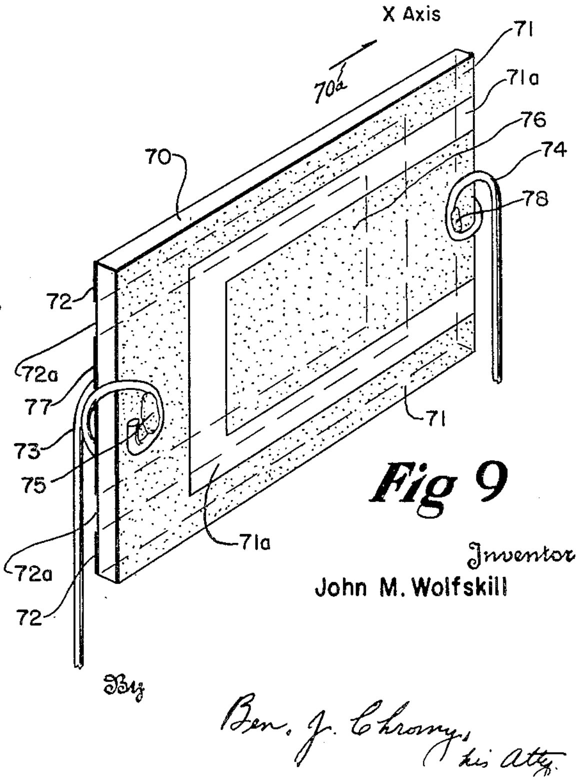
Figure 10:
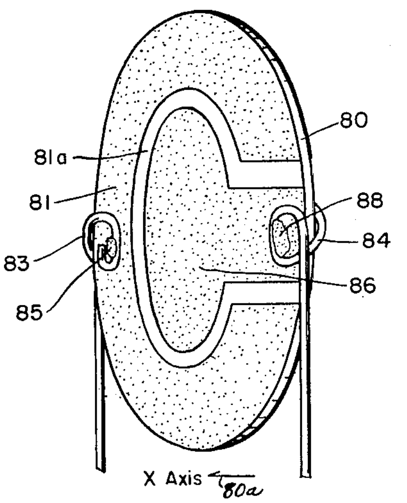
Figure 11:
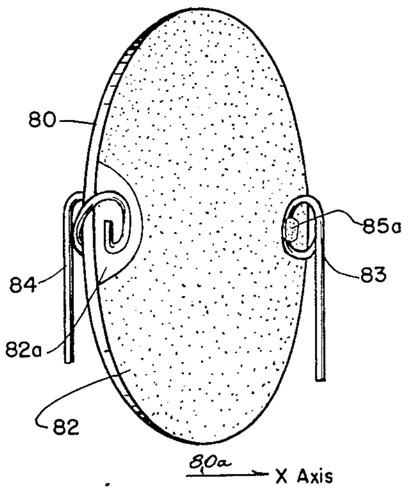
Figure 12:
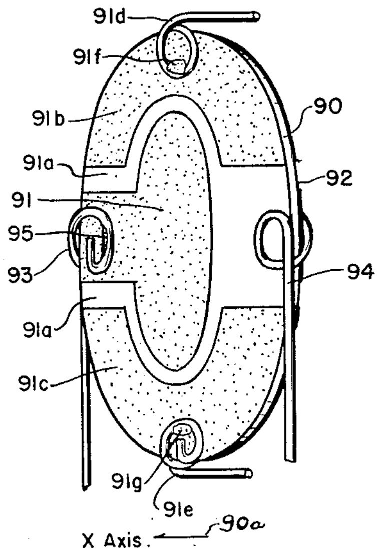
Figure 13:
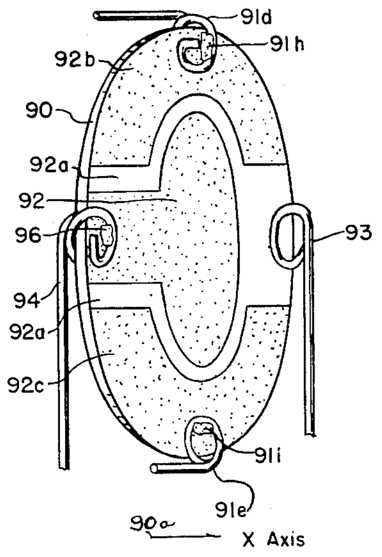
Figure 14:
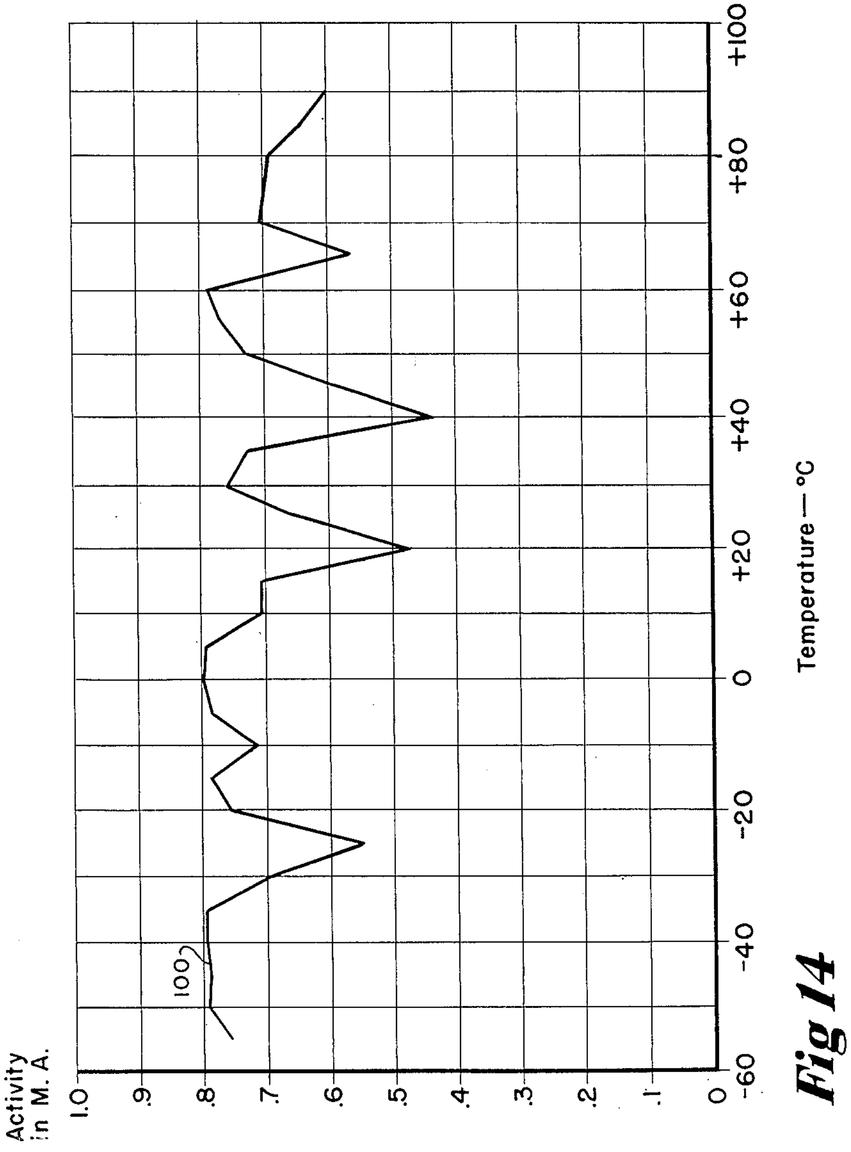
Figure 15:
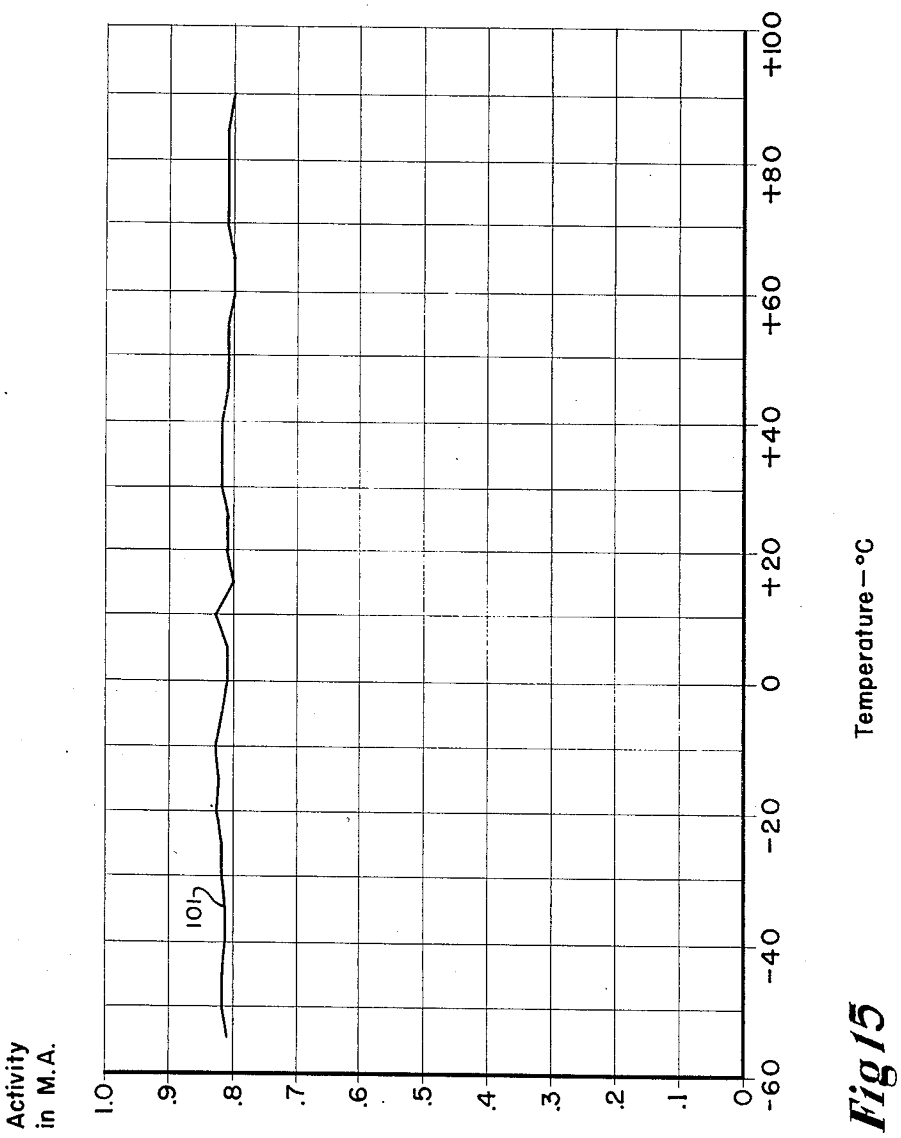

Further details of this invention will be apparent from the following specification, claims and drawings in which Fig. 1 is a view of a piezoelectric crystal blank supported in a rarified atmosphere of inert gas employed for the purpose of facilitating explanation of this invention; Figure 2 is a view of a circular crystal blank employing this invention; Figure 3 is a view of another circular crystal blank employing a modified form of this invention; Figure 4 is a view of a rectangular crystal blank with tubular mounts employing this invention; Figure 5 is a sectional view taken along the line 5—5 of Figure 4; Figure 6 is a view of a circular crystal employing this invention mounted in a metal housing; Figure 7 is a view of a square or rectangular crystal employing this invention, the crystal in this case being supported at corners thereof; Figure 8 shows the crystal blank of square or rectangular configuration supported at diagonally opposite corners; Figure 9 illustrates a square or rectangular crystal blank with still another electrode arrangement in accordance with this invention; Figure 10 illustrates one side of a circular crystal blank with the electrode arrangement thereof; Fig. 11 illustrates the other side of the crystal blank of Fig. 10 and the electrode arrangement of this other side; Fig. 12 is a view showing one side of another circular crystal blank with the electrode arrangement thereof; Fig. 13 is a view showing the other side of the crystal blank shown in Fig. 12 and the electrode arrangement on this other side; Fig. 14 is an activity versus temperature graph showing the variations in activity with temperature change of the crystal blank not employing this invention; Fig. 15 is an activity versus temperature graph showing the variations in activity with temperature change of a crystal blank employing this invention.

Referring to Fig. 1 of the drawing in detail, there is illustrated in this figure a piezoelectric crystal 10 supported by wire loops 13 and 14 in a vessel 17 of glass or the like having a rarified atmosphere of some inert gas such as neon, krypton, xenon, helium or the like. The crystal blank 10 is provided with relatively small button like electrodes 11 and 12 applied to the crystal blank by plating, spraying, sputtering, evaporation or similar processes and these electrodes are connected to the wire loops 13 and 14 respectively through suitable pigtails. The term "pigtail" is intended to define the extension from the electrode 11 to the wire loop 13 and where this term is used in other parts of this specification it is intended to define similar electrode extensions used for the purpose of making a connection to the active electrode. The button like electrodes 11 and 12 cover only small areas of the major faces of the crystal blank 10 and the areas surrounding the electrode coated areas serve as suitable terminations for the excited portion of the crystal blank to reduce interference from coupled modes of vibration as previously described herein.

The wire loops 13 and 14 are connected to the wires 15 and 16, respectively, that are sealed into the glass vessel 17 and these wires 15 and 16 are connected to the vacuum tube oscillator 18 of conventional design that is shown in block form. The areas of the crystal blank 10 outside of the electrodes 11 and 12 accumulate relatively high voltage electrostatic charges thereon indicated by the shaded areas 19 indicated by glow discharges or ionization in the rarified atmosphere adjacent to these areas. These glow discharges move about over the surface of the crystal blank in quick jumps as the temperature of the crystal blank is varied and at the same time the activity of the crystal blank varied resulting in an activity-temperature characteristic such as illustrated by the graph 100 in Fig. 14 wherein the crystal blank activity in milliamperes is indicated on the ordinates and the temperature in degrees centigrade is indicated on the abscissa.

The charges causing the glow discharges indicated by the shaded areas 19 of Fig. 1 were neutralized by providing additional electrodes to the crystal blank as illustrated in Fig. 2. In Fig. 2 is shown a substantially circular crystal blank 20 of the fundamental or harmonic type, provided with small buttons 21 and 22 functioning as the main electrodes. These electrodes are applied to the crystal blank 20 plating, spraying, sputtering, evaporation or similar processes and these electrodes are connected by suitable pigtails to the wire loops 23 and 24 respectively that clamp both the pigtail and the crystal blank edges therebetween. The wire loop 23 is soldered to the pigtail of electrode 21 by a small lump of silver solder 29 to reduce the contact resistance and the loop 24 is similarly soldered to the electrode 22. The term "solder" is intended to define conventional solders as well as conducting cements such as silver conducting cement made by mixing finely divided silver with liquid "Bakelite" cement or similar resin in a liquid state which is baked after being applied to the wire loop, for example, loop 23 and pigtail of electrode 21, so that the "Bakelite" polymerizes and forms a relatively hard conducting material between the wire loop and pigtail. The electrodes 21 and 22 may be given a light coating of silver fired thereto if it is desired to increase the conductivity thereof. A pair of arcuate conducting surfaces 26 and 27 are provided to the crystal blank 20 and these arcuate surfaces are provided to cover substantially all of the surfaces of the major faces of the crystal blank that are not covered by the principal electrodes 21 and 22 respectively. The electrode 21 is partially surrounded by the arcuate electrode 26 and the electrode 22 is similarly partially surrounded by the arcuate electrode 27, however the arcuate electrode 27 is connected to the electrode 21 through the wire loop 23 and the electrode 22 is connected to the arcuate electrode 26 through the wire loop 24 that is soldered to the arcuate electrode 26 by the small lump of silver 28 fired thereto. The wire loop 23 may be similarly soldered to the arcuate electrode 27.

The auxiliary electrodes 26 and 27 may be applied to the crystal blank in the same manner as the electrodes 22 and 23 are applied thereto however care must be taken to separate or insulate the electrode 21 from the electrode 26 and the electrode 22 from the electrode 27. The electrode 21 is spaced from the electrode 26 by the gap 21*a* and the electrode 22 is spaced from the electrode 27 by the gap 22*a*. These gaps 21*a* and 22*a* may be provided by masking the corresponding surface of the crystal blank when the electrodes 21, 22, 26 and 27 are being applied to the crystal blank or they may be cut through the electrodes after the electrodes are applied. For example, if the electrodes 21 and 26 are applied as one electrode originally, the gap 21*a* may be cut after the electrodes 21 and 26 are applied by electrical or mechanical metal cutting processes well known in the art, or the metal electrode may be cut by a suitable chemical solvent such as nitric or hydrochloric acid or aqua regia or other solvents that will convert the metal into soluble salts but will not attack the crystal blank.

The spring clip or wire loop 24 is connected to the mid-portion of the arcuate electrode 26 and to the "pigtail" of electrode 22 and likewise the loop 23 is connected to the mid-portion of the arcuate electrode 27 and to the "pigtail" of the electrode 21. Furthermore, the crystal blank 20 is so oriented that an X-axis of the crystal blank lies substantially parallel to the arrow 20*a* so that an axis passing through both of the wire loops 23 and 24 will be substantially parallel to an X-axis of the crystal blank.

When the crystal 20 shown in Fig. 2, corresponding to the crystal 10 of Fig. 1 was provided with the auxiliary electrodes 26 and 27 and connected to an oscillator circuit as shown in Fig. 1 the crystal blank activity versus temperature characteristic 101 shown in Fig. 15 was obtained. The graph 100 shown in Fig. 14 and the graph 101 shown in Fig. 15 are characteristic curves obtained from the same crystal blank except that graph 100 was obtained prior to the addition of the auxiliary electrodes 26 and 27 and graph 101 after these auxiliary electrodes were added.

In Fig. 3 is shown a modified electrode arrangement applied to a substantially circular crystal 30. In this embodiment of the invention the main electrodes 36 and 37 are the electrodes that are connected to the vacuum tube oscillator circuit or other electrical circuit with which the crystal blank is to be used and these electrodes correspond to the electrodes 21 and 22 of Fig. 2. Auxiliary electrodes 31 and 32 are provided to the crystal blank 30 and these are separated from the electrodes 36 and 37 by the gaps 31*a* and 32*a*, respectively. The electrodes 31 and 37 are connected together by the wire loop 33 and likewise the electrodes 32 and 36 are connected together by the wire loop 34. The loop 33 is soldered to the electrodes 31 and 37 by lumps of solder such as the solder particle 39 and the loop 34 is soldered to the electrodes 32 and 36 by solder such as the piece of solder 38.

Various forms of mountings or supports may be used for supporting the crystal blanks and for providing electrical connections to the crystal blank electrodes instead of the wire loops shown in Figs. 1, 2 and 3 and another form of mounting is shown in Figs. 4 and 5 in which a substantially rectangular crystal blank 40 is supported by two split tubular members 43 and 44. This form of mounting is also suitable for substantially circular crystal blanks such as shown in Fig. 3. The split tubular members 43 and 44 clamp the edge portions of the crystal blank and electrodes therebetween as shown in Fig. 5. Thus the left hand edge portion of the crystal blank 40 and the edges of the main or active electrode 47 and the auxiliary electrode 41 are clamped between the lips 43*a* and 43*b* of the tubular member 43. The main or active electrode 46 and the auxiliary electrode 42 of the right hand edge portion of the crystal blank 40 are clamped between the lips 44*b* and 44*a* of the tubular member 44. The tubular member 43 also serves to connect the electrodes 41 and 47 together and the tubular member 44 also connects the electrodes 42 and 46 together. The electrodes 41 and 46 are insulated from each other by the gap 41*a* and likewise the electrodes 42 and 47 are insulated from each other by the gap 42*a*.

In Figs. 7 and 8 are illustrated embodiments of this invention in which the configuration is in general the same as the electrode configuration of the embodiments of this invention shown in Figs. 3, 4 and 5. However, in the form of this invention shown in Fig. 7 the crystal blank 50 is supported from the lower corners of the blank 50 by the wire loops 53 and 54. The advantage of positioning the wire loops on the lower corners in this manner is that it introduces less damping in the vibration of the crystal blank. The main or active electrode 56 and the auxiliary electrode 52 are connected together by the wire loop 54 and these electrodes may be soldered to the wire loop by small pieces of solder such as the piece 58 soldering the wire loop 54 to the electrode 56. The wire loop 53 is soldered to the main electrode 57 and the auxiliary electrode 51 by solder such as the piece of solder 55. The main electrode 56 is insulated from the auxiliary electrode 51 by the gap 51*a* and the main electrode 57 is insulated from the auxiliary electrode 52 by the gap 52a. The wire loops 53 and 54 are attached to the pins 53a and 54a that are sealed into insulation bead of glass or the like which in turn are sealed to the base 53b of the unit housing that is similar to the housing 20a shown in Fig. 6. In Fig. 6 there is illustrated a crystal blank 20 such as shown in Fig. 2, supported in the housing 20a. The wire mounts 23 and 24 engage the crystal blank electrodes as previously described and these wire mounts are attached to the contact pins 23a and 24a that are sealed to the glass beads 23b and 24b, respectively, that in turn are sealed to the housing base or cover 20d. The base 20d is provided with a groove 20c for receiving the edge 20b of the housing which may be soldered to the said base 20d. This type of housing may be provided to all of the units disclosed herein if desired.

The unit illustrated in Fig. 8 consists of a substantially rectangular crystal blank 60 provided with auxiliary electrodes 61 and 62 and main electrodes 66 and 67, the auxiliary electrode 61 being separated from the main electrode 66 by the gap 61a and the auxiliary electrode 62 being separated from the main electrode 67 by the gap 62a. In this embodiment of the invention the crystal unit is supported from diagonally disposed corners thereof in line with an X-axis 60a of the crystal blank, by the wire loops 63 and 64 that are soldered to the electrodes by solder pieces such as 65 and 68.

Another electrode configuration is illustrated in Fig. 9 in which the crystal blank 70 is provided with auxiliary electrodes 71 and 72 that are substantially U-shaped. The main electrodes 76 and 77 are of rectangular shape and these are separated from the auxiliary electrodes 71 and 72, respectively, by the gaps 71a and 72a respectively. The wire loop 73 is employed to contact the main electrode 77 and the auxiliary electrode 71 and the wire loop 74 is provided to contact the main electrode 76 and the auxiliary electrode 72. These electrodes are soldered by small lumps of solder, such as, 75 and 78 to the wire loops 73 and 74, respectively. In a configuration of the type shown in Fig. 9 the active electrodes 76 and 77 have instantaneous opposite polarity but the electrodes 71 and 72 around the periphery also have opposite polarity but are of different sign, at the instant the active electrodes have a given polarity. In effect this stresses the periphery of the crystal 70 in direct opposition to the stress applied to the active area of the crystal. In other words this further discourages unwanted modes due to the finite dimension of the plate 70 and edge effects.

A modified form of this invention is illustrated in Figs. 10 and 11 wherein the crystal blank 80 is provided with a main or active electrode 86 and an auxiliary electrode 81 on one side thereof as shown in Fig. 10. The other side of the crystal blank 80 is provided with one electrode 82 that covers practically the whole surface of the corresponding major face of the crystal blank 80 except the area 82a surrounding the wire loop 84, as shown in Fig. 11. The wire loop 83 contacts the electrodes 82 and 81 and is soldered thereto by the pieces of solder 85a and 85, respectively. The main electrode 86 is soldered to the wire loop 84 by the solder 88 on one side of the crystal blank and on the other side the wire loop 84 engages the crystal blank in the area 82a, care being taken to provide sufficient space in the area 82a to keep the wire loop 84 out of contact with the electrode 82.

In the form of the invention shown in Figs. 10 and 11 the portion of the electrode 82 opposite the active electrode 86 functions as the other active electrode and the portion of this electrode 82 that is opposite the auxiliary electrode 81 functions as a shorting electrode. In this embodiment of the invention the edges of the crystal blank 80 may be plated or coated with electrode material all around the crystal blank except the part of the circumference adjoining the area 82a of Fig. 11 so that the electrodes 81 and 82 may be connected by this edge coating.

The form of this invention shown in Figs. 12 and 13 employs a pair of button electrodes 91 and 92 soldered to the wire loops 93 and 94, respectively, by the solder 95 and 96, respectively. Arcuate electrodes 91b and 91c are positioned on opposite sides of the main or active electrode 91 and these arcuate electrodes are spaced and insulated from the electrode 91 by the gap 91a. Likewise the other side of the crystal blank 90 is provided with a pair of arcuate electrodes 92b and 92c corresponding to the electrodes 91b and 91c, respectively, and these arcuate electrodes are connected in pairs by the wire loops 91d and 91e and these loops are soldered to the electrodes 91b and 92b and electrodes 91c and 92c, respectively, by the solder 91f, 91h, 91g and 91i, respectively. In this form of the invention the auxiliary electrodes 91b, 91c, 92b and 92c are not connected to the main electrodes as in the other forms of this invention. However, with these shorted electrodes complete deadening or inactivation of the corresponding areas exists.

The illustrations shown employ wire loops for supporting means, however, other methods may be employed for supporting the crystals as well as connecting the plated surface. In any case, additional support and lower contact resistance may be obtained by making use of a conducting paste which is applied in this case to the wire loops and is subsequently either air dried or fired to the plated surface and the support means.

By making use of these shorted electrodes or connecting the active electrodes to the peripheral plated area of the crystal any coupling to unwanted modes is practically completely eliminated.

I have found in the shorted type of electrode that it is desirable particularly in square or rectangular crystals to run the X or electrical axis direction in line with the support loops because this provides a better termination for X direction flexures than if the X-axis were mounted in line or parallel to the divided plating line, and complete termination of the X direction is thereby accomplished. This direction of the X-axis is indicated in Figs. 2, 3, 4, 7, 8, 9, 10, 11, 12 and 13 by the arrows 20a, 30a, 40a, 50a, 60a, 70a, 80a and 90a respectively. However, it is not desired to limit this invention to crystal blanks oriented in this fashion with respect to the mounting means or supports.

While this invention is set forth in the specification in detail with respect to certain embodiments thereof it is not desired to limit the invention to those exact embodiments except insofar as they are defined by the following claims.

What I claim is:

1. Piezoelectric crystal apparatus comprising a piezoelectric crystal blank having a pair of major faces, the dimensions of said major faces being equal to several times the thickness dimension of said crystal blank, one of said major faces having a relatively small electrode over the central area thereof and the other of said major faces having an electrode covering substantially the entire area thereof, an auxiliary electrode insulated from said first mentioned electrode for covering substantially all of the surface of said first mentioned major face that is not covered by said first mentioned electrode, and connections for connecting said auxiliary electrode to said second mentioned electrode for substantially preventing electric charges on the unused portion of said crystal blank from stimulating undesired modes of oscillation.

2. Piezoelectric crystal apparatus comprising a piezoelectric crystal blank having a pair of major faces, the dimensions of said major faces being equal to several times the thickness dimension of said crystal blank, relatively small electrodes substantially over the central areas of said major faces for connecting said blank to an electric circuit, auxiliary electrodes insulated from said first mentioned electrodes for covering the substantially inactive areas of said major faces for substantially preventing electric charges on said inactive areas from stimulating undesired modes of oscillation in said crystal blank.

3. Piezoelectric crystal apparatus comprising a piezoelectric crystal blank having a pair of major faces, the dimensions of said major faces being equal to several times the thickness dimension of said crystal blank, relatively small electrodes substantially over the central areas of said major faces for connecting said blank to an electric circuit, auxiliary electrodes insulated from selected ones only of said first mentioned electrodes for covering the substantially inactive areas of said major faces for substantially preventing electric charges on said inactive areas from stimulating undesired modes of oscillation in said crystal blank.

4. Piezoelectric crystal apparatus comprising a piezoelectric crystal blank having a pair of major faces, the dimensions of said major faces being equal to several times the thickness dimension of said crystal blank, relatively small electrodes contacting the active areas of said crystal blank for connecting said crystal blank to an electric circuit, auxiliary electrodes substantially encircling at least one of said relatively small electrodes and contacting the substantially inactive areas of said crystal blank and connections to said auxiliary electrodes for neutralizing the charges on said inactive areas for substantially preventing said latter areas from stimulating undesired modes of oscillation in said crystal blank.

5. Piezoelectric crystal apparatus comprising a piezoelectric crystal blank having a pair of major faces, the dimensions of said major faces being equal to several times the thickness dimension of said crystal blank, relatively small electrodes contacting the active areas of said crystal blank for connecting said crystal blank to an electric circuit, substantially U-shaped auxiliary electrode means substantially encircling at least one of said relatively small electrodes and contacting the substantially inactive areas of said crystal blank for substantially preventing said latter areas from stimulating undesired modes of oscillation in said crystal blank.

6. Piezoelectric crystal apparatus comprising a piezoelectric crystal blank having a pair of major faces, the dimensions of said major faces being equal to several times the thickness dimension of said crystal blank, relatively small electrodes contacting the active areas of said crystal blank for connecting said crystal blank to an electric circuit, high resistance coatings contacting the substantially inactive areas of said crystal blank for dissipating the electric charges of said latter areas for substantially preventing said latter areas from stimulating undesired modes of oscillation in said crystal blank.

7. Piezoelectric crystal apparatus comprising a piezoelectric crystal blank having a pair of major faces, said major faces having dimensions equal to several times the thickness dimension of said crystal blank, small button shaped electrodes for the central active portion of said major faces for connecting said crystal blank to an electrical circuit, the areas around said active portion forming mechanical terminations for said active portion of said crystal blank to provide increased frequency and piezoelectric activity stability in said crystal blank over a wide temperature range, means attached to said electrodes and to opposite points on edges of said crystal blank substantially in alignment with an X-axis of said crystal blank for resiliently supporting said crystal blank and means for substantially preventing undesired electrostatic charges from accumulating on said areas around said active portion.

8. Piezoelectric crystal apparatus comprising a piezoelectric crystal blank having a pair of major faces, said major faces having dimensions equal to several times the thickness dimension of said crystal blank, small button shaped electrodes for the central active portion of said major faces for connecting said crystal blank to an electrical circuit, the areas around said active portion functioning as mechanical terminations for said active portion of said crystal blank to provide increased frequency and piezoelectric activity stability in said crystal blank over a wide temperature range, means attached to said electrodes and to opposite points on edges of said crystal blank for resiliently supporting said crystal blank and means for substantially preventing undesired electrostatic charges from accumulating on the areas around said active portion.

9. Piezoelectric crystal apparatus comprising a piezoelectric crystal blank having a pair of major faces, said major faces having dimensions equal to several times the thickness dimension of said crystal blank, electrodes for said major faces for connecting said crystal blank to an electrical circuit, at least one of said electrodes contacting only parts of the areas of said major faces forming the active portion of the crystal blank, the areas adjacent to said active portion forming substantially inactive portions that function as mechanical terminations for said active portion to provide increased frequency and piezoelectric activity stability in said crystal blank over a wide temperature range, means attached to said electrodes and to opposite points on edges of said crystal blank for resiliently supporting said crystal blank and means for substantially preventing undesired electrostatic charges from accumulating on said inactive edge portions.

10. Piezoelectric crystal apparatus comprising a piezoelectric crystal blank having a pair of major faces, said major faces having dimensions equal to several times the thickness dimension of said crystal blank, electrodes for said major faces for connecting said crystal blank to an electrical circuit, at least one of said electrodes contacting only parts of the areas of said major faces forming the active portion of the crystal blank, the areas adjacent to said active portion forming substantially inactive portions that function as mechanical terminations for said active portion to provide increased frequency and piezoelectric activity stability in said crystal blank over a wide temperature range, means attached to said electrodes and to opposite points on edges of said crystal blank for resiliently supporting said crystal blank and means insulated from said first mentioned electrodes for substantially preventing undesired electrostatic charges from accumulating on said inactive portions.

11. Piezoelectric crystal apparatus comprising a piezoelectric crystal blank having a pair of major faces, said major faces having dimensions equal to several times the thickness dimension of said crystal blank, electrodes for said major faces for connecting said crystal blank to an electrical circuit, at least one of said electrodes contacting only parts of the areas of said major faces forming the active portion of the crystal blank, the areas adjacent to said active portion forming substantially inactive portions that function as mechanical terminations for said active portion to provide increased frequency and piezoelectric activity stability in said crystal blank over a wide temperature range, means attached to said electrodes and to opposite points on edges of said crystal blank for resiliently supporting said crystal blank and auxiliary metallic coatings contacting said inactive portions of said major faces to substantially prevent undesired electrostatic charges from accumulating on said inactive edge portions.

12. Piezoelectric crystal apparatus comprising a piezoelectric crystal blank having a pair of major faces, said major faces having dimensions equal to several times the thickness dimension of said crystal blank, electrodes for said major faces for connecting said crystal blank to an electrical circuit, at least one of said electrodes contacting only small substantially centrally disposed areas of said major faces to provide substantially inactive edge portions around the active portions of said crystal blank, said inactive portions forming mechanical terminations for said active portion of said crystal blank to provide increased frequency and piezoelectric activity stability in said crystal blank over a wide temperature range, means attached to said electrodes and to opposite points on edges of said crystal blank substantially in alignment with an X-axis of said crystal blank for resiliently supporting said crystal blank and an auxiliary metallic coating insulated from at least one of said first mentioned electrodes, said auxiliary coating contacting said inactive edge portions of said major faces to substantially prevent undesired electrostatic charges from accumulating on said inactive edge portions.

13. Piezoelectric crystal apparatus comprising a piezoelectric crystal blank having a pair of major faces, said major faces having dimensions equal to several times the thickness dimension of said crystal blank, truncated circular electrodes for said major faces for connecting said crystal blank to an electrical circuit, said electrodes contacting only parts of the areas of said major faces forming the active portion of the crystal blank, the areas adjacent to said active portion forming substantially inactive portions that function as mechanical terminations for said active portion to provide increased frequency and piezoelectric activity stability in said crystal blank over a wide temperature range, means attached to said electrodes and to opposite points on edges of said crystal blank for resiliently supporting said crystal blank and means for substantially preventing undesired electrostatic charges from accumulating on said inactive edge portions.

14. Piezoelectric crystal apparatus comprising a piezoelectric crystal blank having a pair of major faces, said major faces having dimensions equal to several times the thickness dimension of said crystal blank, electrodes for contacting active parts of the surfaces of said major faces, said crystal blank having inactive parts that function as mechanical terminations for said active parts to increase the frequency stability and piezoelectric activity of said crystal blank over a wide temperature range, resilient means attached to said electrodes and engaging said crystal blank substantially in alignment with an X-axis of said crystal blank for supporting said crystal blank and auxiliary electrode means insulated from at least one of said first mentioned electrodes, said auxiliary electrode means contacting surfaces of the inactive parts of said major faces to substantially prevent undesired electrostatic charges from accumulating on said last mentioned surfaces or parts thereof.

JOHN M. WOLFSKILL.

References Cited in the file of this patent

UNITED STATES PATENTS

| Number | Name | Date |
|---|---|---|
| 2,258,967 | Bokovay | Oct. 14, 1941 |
| 2,284,753 | Mason | June 2, 1942 |
| 2,315,392 | Bokovay | Mar. 30, 1943 |
| 2,321,358 | Bokovay | June 8, 1943 |
| 2,343,059 | Hight | Feb. 29, 1944 |
| 2,385,896 | Beckerath | Oct. 2, 1945 |
| 2,392,429 | Sykes | Jan. 8, 1946 |
| 2,453,435 | Havstad | Nov. 9, 1948 |
| 2,482,661 | Dimmick | Sept. 20, 1949 |

FOREIGN PATENTS

| Number | Country | Date |
|---|---|---|
| 554,789 | Great Britain | July 17, 1942 |